Feb. 13, 1934.  H. A. DOUGLAS  1,946,967
ASSEMBLING MEANS
Filed Oct. 14, 1932

Inventor
Harry A. Douglas
By Langdon Moore
Atty.

Patented Feb. 13, 1934

1,946,967

UNITED STATES PATENT OFFICE 1,946,967

ASSEMBLING MEANS

Harry A. Douglas, Bronson, Mich.

Application October 14, 1932. Serial No. 637,720

5 Claims. (Cl. 248—20)

This invention relates to assembling means more particularly which employ mounting brackets and clamping members therefor and a principal object of the invention is to improve and simplify said structures.

Among other objects the invention aims to provide a two-piece adjustable bracket which is of particular utility for readily and securely mounting a switch structure, for example, upon the dashboard of an automotive vehicle.

The invention will be more fully explained by reference to the illustrative embodiment thereof shown in the accompanying drawing in which—

Figure 1:
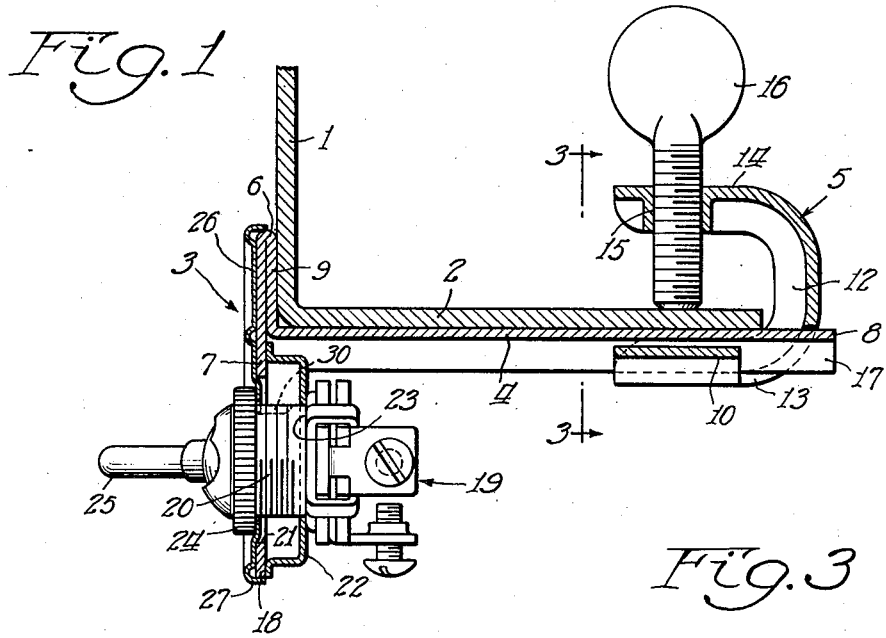
Figure 1 is a cross-sectional view of an automotive vehicle dashboard having the preferred form of the device of my invention applied thereto.

In accordance with one use of my invention, I have illustrated a dashboard of an automotive vehicle, such dashboard being inclusive of an upright body portion 1 and a rearwardly directed ledge 2 constituting a horizontal portion of the board. The portions 1 and 2 are thus angularly related and constitute a support which may be employed in combination with my invention to assemble a mounting bracket 3 therewith.

In accordance with my invention, the mounting bracket 3 is inclusive of a bar 4 and a clamping jaw 5 adjustable thereon. The bar 4 is here shown folded upon itself in a return bend as at 6 to T-shape, the portion 7 constituting the head of the T and the portion 8 the leg. One of the branches 9 of the head of the T may be advantageously disposed to abut the vertical portion 1 of the dashboard and the leg 8 of the T may be disposed to abut the horizontal portion 2 of the dashboard, the bracket being clamped to the dashboard by the clamping jaw 5 as next described.

Figure 4:
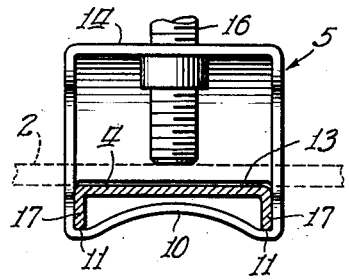
Figure 4 is a perspective view in separated relation of the two pieces of the bracket.
Figure 4:
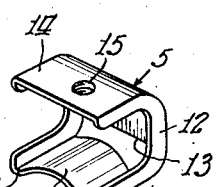
Figure 4:
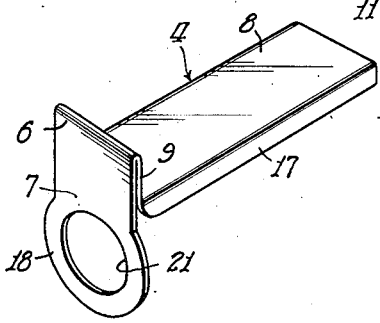

The clamping jaw 5 is shown U-shape and desirably of channel formation, the channel being inwardly directed as best shown in Figure 4. One of the sides 10 of the jaw 5 is desirably medially arched inwardly of the jaw to constitute grooves 11 to provide a runway for the bar 4 as presently described. Also the jaw 5 is apertured through the trough 12 of the jaw as here shown by the slot 13 adjacent the side 10. The side 14 of the jaw 5 opposite the side 10 has a threaded hole 15 therein through which the thumb screw 16 threadedly passes in a direction transverse to the sides 10 and 14 and adapted to be screwed toward and away from the side 10. The portion 8 of the bar 4 is also desirably of channel section but inverted with respect to the side 10 of the jaw 5, so that the portion 8 of the bar 4 may be telescopically received in the jaw 5 with respect to the side 10 of the jaw, the flanges 17 of the leg 8 sliding snugly into the grooves 11 of the jaw. The aperture in the trough of the jaw represented by the slot 13 permits the leg 8 to pass therethrough, so that the jaw may be located in selective longitudinal adjustment on the leg 8.

Figure 3:
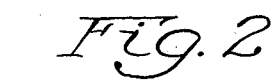
Figure 3 is a cross-section taken on the line 3—3 of Figure 1.
Figure 3:
Figure 2:
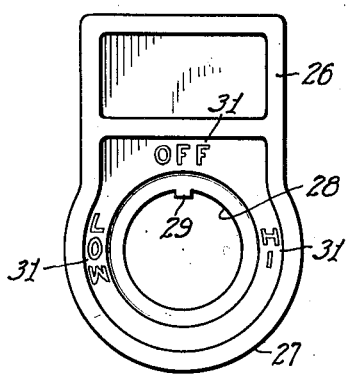
Figure 2 is an elevational view of a separable nameplate for assembly with my improved structure.

As shown in Figures 1 and 3, the jaw 5 thus not only receives the leg 8, but may also receive the horizontal portion 2 of the dashboard and the thumb screw 16 may be screwed inwardly of the jaw to clamp both the portion 2 of the dashboard and the leg 8 of the bar 4 tightly against the side 10 of the jaw, thus securely clamping the bar 4 to the dashboard. The telescopic interengagement of the leg 8 and side 10 of the jaw prevents rotation of the jaw with respect to the bar 4 as the screw 16 is rotated to be tightened. Also the medially arched side 10 of the jaw which projects into the channel of the leg 8 materially strengthens the parts while minimizing the size thereof. Abutment of the branch 9 of the head 7 of the T with the vertical portion 1 of the dashboard prevents rotation of the entire bracket 3 with respect to the dashboard and maintains alignment of the plane of the head 7 of the bracket with respect to the plane of the portion 1 of the dashboard.

So constructed and arranged the other branch 18 of the head 7 of the T-shape bar 4 may be advantageously employed to mount an operated device, such as the switch structure 19. This switch structure 19, as here shown, comprises a cylindrical metallic casing 20 which is exteriorly threaded, the casing 20 being passed from the rear of the dashboard through the circular opening 21 in the branch 18, a cup-shape spacing washer 22 being desirably interposed between the branch 18 and the shoulder 23 formed on the casing 20. A knurled nut 24 may then be screwed onto the casing 20 from the front of the dashboard securing the switch structure 19 to the bracket. The operating handle 25 of the switch thus projects forwardly of the dashboard for convenient manual operation.

To indicate selective operative positions of the operating handle 25, the head 7 of the T-shape bar 4 may also mount a separable legend plate 26 which is desirably shaped to conform to the head 7 and has the marginal flange 27 which fits snugly over the edge of the head. By interposing this plate 26 between the knurled nut 24 and the face of the head 7, the plate is securely attached thereto. A central aperture 28 in the plate 26 permits the casing 20 to pass therethrough and a lug 29 directed inwardly of this aperture mates with a longitudinal groove 30 in the casing 20 to fix the relative rotative positions of the plate 26 and casing 20, so that the legends 31 on the plate will correctly correspond with the appropriate operative positions of the handle 25.

Having described an embodiment of my invention, I claim:

1. The combination with a support having angularly related portions; of a T-shape bracket, one of the branches of the head of the T lapping one of the portions and the leg of the T lapping the other portion, said leg being of channel cross-section; a U-shape jaw having a slot therein adjacent one of its sides receiving the said leg and having said side invertedly channeled to nest said leg therein; a screw passing threadedly through the other side of the jaw and adjustably clamping the portion of the support lapped by the said leg, which is also received in said jaw, and said leg together; a separable plate covering the head of the T; and a switch structure secured in the other branch of the head of the T opposite the first branch and clamping said plate thereto.

2. The structure of claim 1 wherein the channel side of the U is medially arched to project into the channel of the leg.

3. The structure of claim 1 wherein the bracket is formed from a single piece of metal folded upon itself in a return bend to form the head of the T.

4. The combination of a U-shape jaw having a slot therethrough in the trough thereof, one side of the jaw being of channel formation facing inwardly of the jaw; a channel shape bar received in said jaw and passing through said slot telescopically of the channel shape side whereby the flanges of the channel are in overlapping relation; and a screw passing threadedly through the other side of the jaw and pressing said channels together, whereby the jaw may be clamped to the bar in selective longitudinal adjustment.

5. A two-piece adjustable bracket embodying a bar bent upon itself to provide a vertical portion and a horizontal portion; a separable jaw receiving said horizontal portion therein; means for clamping the horizontal portion against one of the sides of the jaw; and means for adjusting the jaw longitudinally of the horizontal portion.

HARRY A. DOUGLAS.